United States Patent [19]

Shuler

[11] Patent Number: 4,679,811

[45] Date of Patent: Jul. 14, 1987

[54] BICYCLE REAR SUSPENSION SYSTEM

[76] Inventor: Jerry N. Shuler, 3019 Stanford Rd., Fort Collins, Colo. 80525

[21] Appl. No.: 878,629

[22] Filed: Jun. 26, 1986

[51] Int. Cl.[4] ............................................. B62K 25/10
[52] U.S. Cl. .................................. 280/284; 180/227; 188/67; 188/129
[58] Field of Search ............... 280/284, 285, 274, 275, 280/281 R, 283; 180/227; 188/83, 67, 129

[56] References Cited

U.S. PATENT DOCUMENTS

| | | | |
|---|---|---|---|
| 644,957 | 3/1900 | Williams | 280/284 |
| 1,068,583 | 7/1913 | Harley | 280/284 |
| 1,071,892 | 9/1913 | Diepenhorst | 280/284 |
| 3,856,285 | 12/1974 | Yamada | 188/129 |
| 3,877,539 | 4/1975 | Tilkens | 280/284 |
| 4,182,508 | 1/1980 | Kallai | 280/283 |
| 4,479,397 | 10/1984 | Jelinek | 188/67 |
| 4,572,317 | 2/1986 | Isono | 280/285 |
| 4,582,343 | 4/1986 | Waugh | 280/284 |

FOREIGN PATENT DOCUMENTS

| | | | |
|---|---|---|---|
| 344960 | 12/1936 | Italy | 280/285 |
| 405635 | 8/1943 | Italy | 280/284 |
| 179427 | 5/1962 | Sweden | 280/284 |

*Primary Examiner*—John J. Love
*Assistant Examiner*—Everett G. Diederiks, Jr.

[57] ABSTRACT

A rear wheel suspension system for bicycles having "on-demand" mode selection. The bicycle can be made "rigid" (no shock-absorbing movement of the rear wheel) or "sprung" (rear wheel movement) by means of a swing-arm wheel mount and an elastomer cylinder inside a rear shock absorber, which is manually actuated, such as by a remote lever on the handlebars, and connected to the shock absorber by a cable.

4 Claims, 2 Drawing Figures

BICYCLE REAR SUSPENSION SYSTEM

BACKGROUND OF THE INVENTION

1. Field of the Invention

The present invention relates generally to a rear suspension system of a two wheeled pedal vehicle, such as a bicycle. More particularly, the invention relates to the mechanical function of a shock absorber which is an integral part of said suspension system.

2. Description of the Related Art

Bicycles of the type known as Mountain Bikes or ATB's (All Terrain Bicycle) are conventionally constructed in a rigid frame design. As one of the primary advantages of this type of bicycle is the ability to be ridden off-road, a comfortable ride is obviously desired. Rigid frame bicycles rely on special tires (wide cross section) and a small amount of natural flexibility in the frame and front forks to absorb somewhat the bumps of the road and trail. Adding rear suspension to the bicycle would substantially improve the smoothness of the ride.

However, a bicycle utilizing rear suspension one hundred percent of the time is not desirable. A rider, when pedaling hard for maximum power and efficiency, prefers a rigid frame whereby human energy output is vectored directly to the rotation of the rear wheel. It is an object of this invention to provide a frame design which incorporates both systems—rigid and suspended, allowing the rider to choose on demand which mode he prefers for that particular riding situation. The rider can switch back and forth instantly, such as by means of the actuation of a control lever on the handlebars, without dismounting from the bike or interrupting his pedaling cadence.

SUMMARY OF THE INVENTION

The present invention relates to a bicycle rear suspension system which enables on-demand mode selection. The rear wheel is mounted on a swing-arm seat stay assembly, which pivots behind the bottom bracket shell, and is connected to a shock absorber by means of a pivotal junction at the top of the seat stays. The non-movable end of the shock absorber is anchored inside the top tube which is open at the rear. A mechanism within the shock absorber is manually actuated such as by a control lever on the handlebars by means of a cable. The shock absorber can be "locked" to make the bicycle "rigid" simply by positioning the lever to a known setting. Re-positioning the lever to its original setting releases the shock absorber to make the bicycle "sprung".

Therefore it is an object of the present invention to provide an on-demand rear-suspension system, which can be actuated or de-actuated instantly and at any time by the rider. A further object of the present invention is to provide comfortable and smooth off-road and on-road riding without compromising bicycle performance.

DETAILED DESCRIPTION OF THE PREFERRED EMBODIMENT

Figure 1:
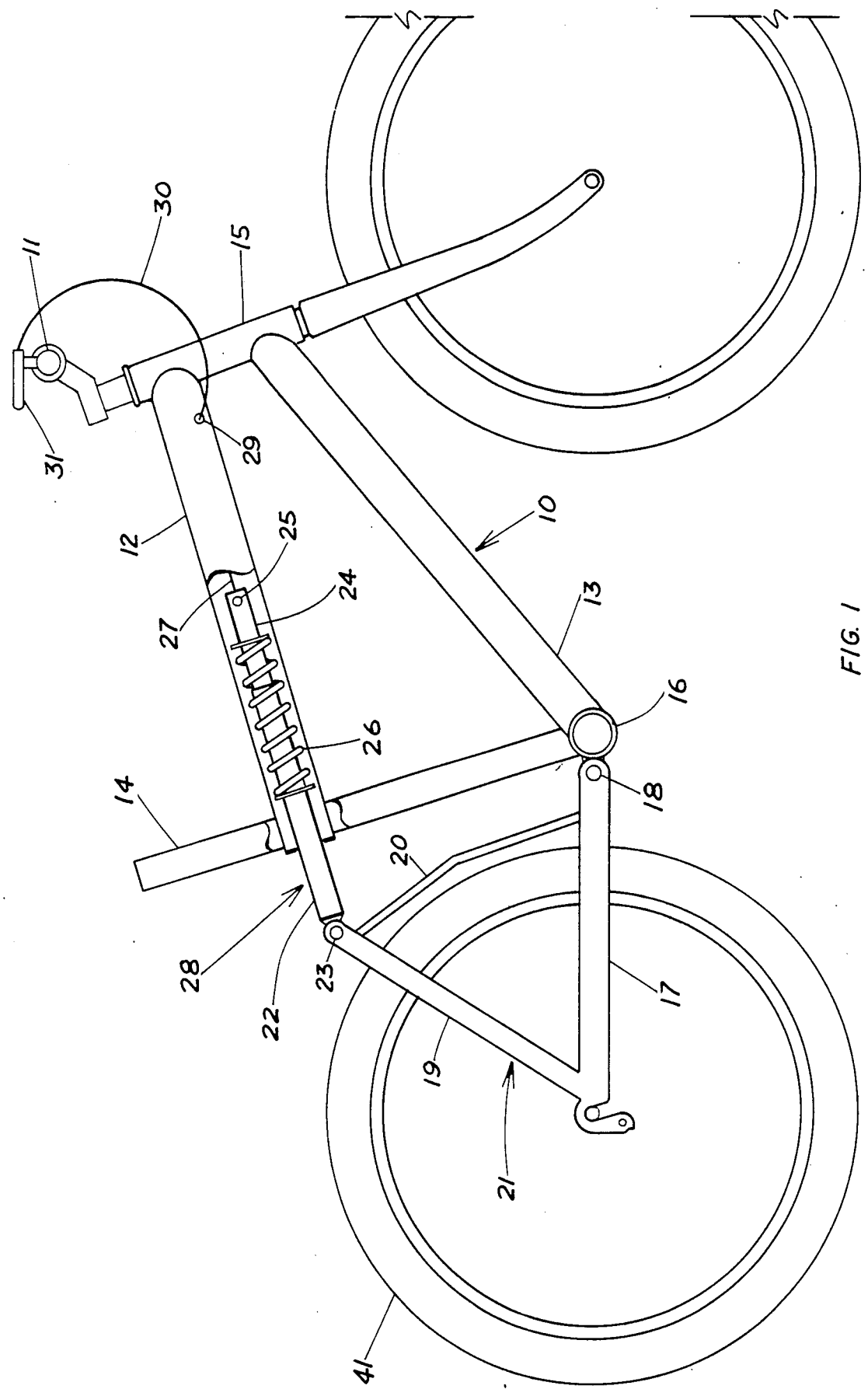
FIG. 1 is a fragmented side elevation view of a bicycle employing the present invention.

With reference to FIG. 1, there is illustrated a bicycle mainframe 10 which includes a top tube 12, a down tube 13, a seat tube 14, a steerer tube 15, a bottom bracket shell 16, and other known structure, such as a handlebar 11, and according to the present invention, a shock absorber 28. A swing arm 17, is pivotally attached at a swing arm pivot 18, directly behind said bottom bracket shell 16. Said swing arm 17 is joined with seat stays 19, and a swing arm front support 20, to comprise a complete rear frame 21.

The top junction of said seat stays 19 is pivotally mounted to a movable outer tube 22 of said shock absorber 28, at a rear anchor point 23. A forward main non-movable inner tube 24 of the shock absorber 28 is mounted inside said top tube 12, by cross bolt at a front anchor point 25. A main compression spring 26 is also located inside the top tube 12, being an integral part of the shock absorber 28. An actuating cable 27 exits the front of the shock absorber 28, travels along the interior of the top tube 12, where it passes through a cable housing seat 29, mounted through the top tube 12, continues through a cable housing 30, to a control lever 31 mounted on said handlebar 11.

Figure 2:
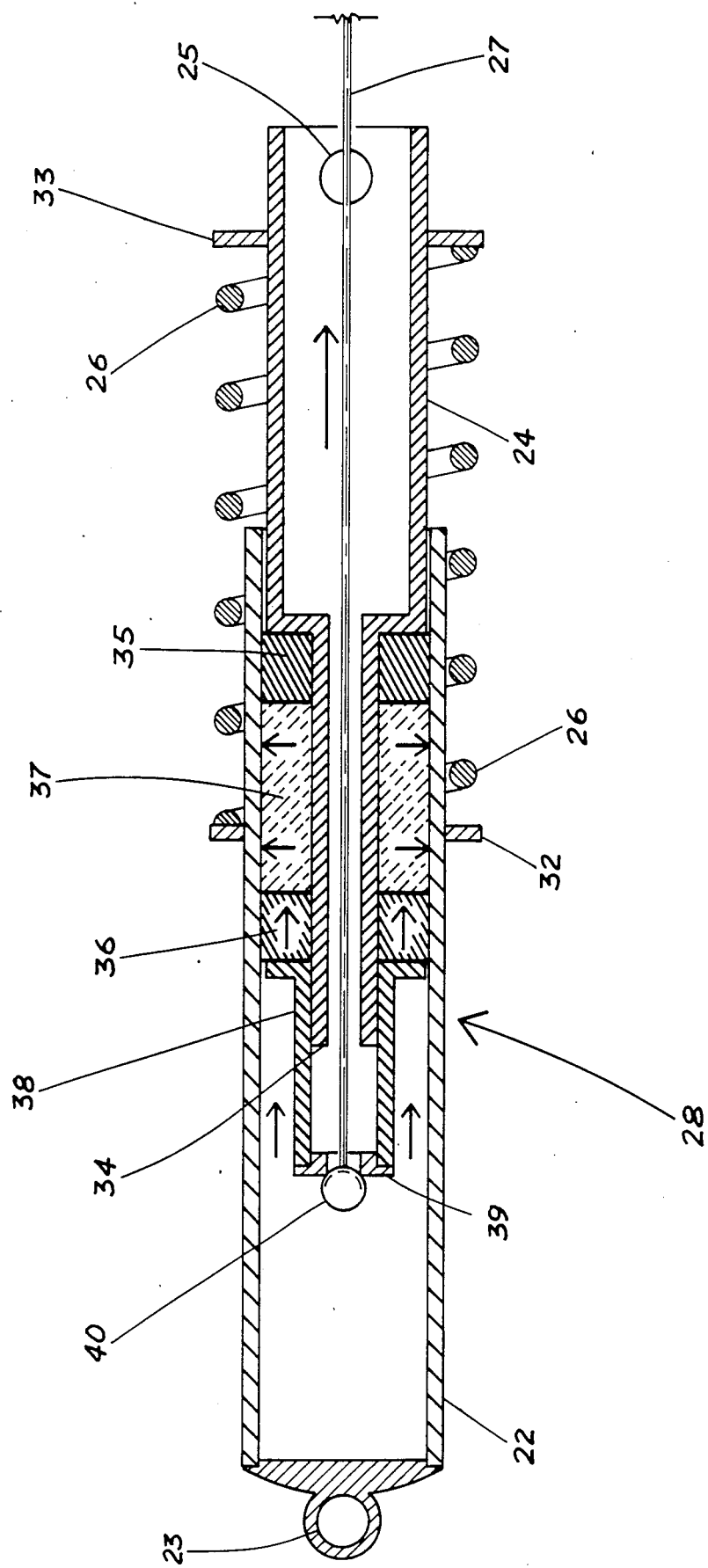
FIG. 2 is a cross section side elevation view of the shock absorber.

FIG. 2 is a cross section side elevation view of the shock absorber 28. Said movable outer tube 22 is fixedly joined to said rear anchor point 23; a rear stop ring 32 for restraint of the main compression spring 26 is also fixedly joined to the movable outer tube 22. Said main non-movable inner tube 24 is fixedly joined to a front stop ring 33. A smaller diameter inner tube 34 is fixedly joined to, and extends concentrically from the main non-movable inner tube 24. Mounted concentrically over said smaller diameter inner tube 34 is a fixed cylindrical piston 35, an elastomer cylinder 37, a sliding cylindrical piston 36, and a sliding compression tube 38. Said actuating cable 27 passes through the axial centerline of the shock absorber 28 and bears against a compression tube end cap 39 of said sliding compression tube 38, by means of a cable ball end stop 40.

Said fixed cylindrical piston 35, sliding cylindrical piston 36, and elastomer cylinder 37 slide along the inner bore of the movable outer tube 22, during normal compression and rebound of the shock absorber 28, by means of the main compression spring 26, and displacement of rear wheel 41 about said swing arm pivot 18. When lockup of the shock absorber 28 is desired, the actuating cable 27 is pulled by means of said control lever 31 in the direction of the arrow, in FIG. 2, to the right. During this action, said cable ball end stop 40 is drawn against said compression tube end cap 39. At this point the sliding compression tube 38, is also shifted in the same direction as indicated by arrows (to the right) as the actuating cable 27 is pulled. The sliding compression tube 38 bears against the sliding cylindrical piston 36, which is also shifted to the right, as indicated by arrows. As the elastomer cylinder 37 is compressed by the sliding cylindrical piston 36, it is confined at both ends by the two piston inner faces. It is also confined along its bore by the smaller diameter inner tube 34. Therefore, the only direction the elastomer cylinder 37 can move is to expand radially outward, as indicated by arrows in FIG. 2. Since the elastomer cylinder 37 is contained by the movable outer tube 22, it therefore expands against the inner wall of the movable outer tube 22, until the friction builds up sufficiently to produce "lock-up". At this point, the shock absorber 28 becomes non-movable, thus making the bicycle essentially "rigid". Relaxing the actuating cable 27 immediately releases the compressive force within the elastomer cylinder 37, allowing the shock absorber 28 to become "unlocked", resulting in the bicycle being "sprung" again. Dampening of the linear movement of the shock absorber 28 (compression and rebound) is achieved by simply applying a slight constant tension on the actuating cable 27 by means of the control lever 31. This constant tension in turn applies partial compression to the elastomer cylinder 37, to cause a frictional drag between the elastomer cylinder 37 and the inner wall of the movable outer tube 22, thus causing a dampening effect during compression and rebound, hence a "stiffening" of the suspension.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

I claim:

1. A rear suspension system for a bicycle, said bicycle having a main frame including a top tube, a seat tube, a bottom bracket shell, and a swing arm pivot and a rear frame assembly which includes a swing arm, a pair of seat stays, a swing arm front support and a rear wheel all pivotally mounted to said main frame at the junction of said swing arm pivot and said swing arm, comprising:

a tubular shock absorber assembly employing linear reciprocating motion mounted coaxially inside said top tube, said tubular shock absorber assembly having a front anchor point attached to said top tube and a rear anchor point extending through and beyond an open rearward end of said top tube and being pivotally connected to a junction point of said seat stays, said tubular shock absorber assembly including an inner tube having a reduced diameter portion at one end thereof, an outer tube slidably mounted about said inner tube, and a compression spring mounted around and operatively connected between said inner and outer tubes;

a means for remotely adjusting the dampening characteristics of said tubular shock absorber assembly including an elastomer cylinder slidably mounted on said reduced diameter portion, a sliding compression tube mounted on said reduced diameter portion concentric to said elastomer cylinder and a sliding piston mounted between said elastomer cylinder and said sliding compression tube, said sliding compression tube being connected to an operator actuated control lever by means of a cable such that when actuated, said control lever, through said cable, moves said sliding compression tube and said sliding piston relative to said reduced diameter portion against said elastomer cylinder, compressing said elastomer cylinder in the longitudinal direction of said tubular shock absorber assembly, the longitudinal compression of said elastomer cylinder resulting in a diametric increase of said elastomer cylinder which acts between the outer surface of the reduced diameter portion of said inner tube and an inner surface of said outer tube such that the damping characteristics of the tubular shock absorber assembly is adjusted.

2. A bicycle rear suspension system as recited in claim 1 wherein said front anchor point pivotally attaches an end of said inner tube, opposite said reduced diameter portion, to said top tube, and the diametric increase of said elastomer cylinder, directly proportional to the linear deformation of the elastomer cylinder, contacts the inner wall of the outer tube with sufficient force to inhibit relative movement between the inner and outer tubes.

3. A bicycle rear suspension system as recited in claim 2 wherein said means for remotely adjusting the damping characteristics of said tubular shock absorber assembly includes a fixed piston mounted to said inner tube concentric to said elastomer cylinder at an end opposite to said sliding piston.

4. A bicycle rear suspension system as recited in claim 3 wherein said sliding compression tube includes an end cap having a central hole therein through which said cable extends, said cable having a ball attached at the end thereof which has a diameter greater than that of said hole.

* * * * *